United States Patent [19]
Schmitzer

[11] 3,940,629
[45] Feb. 24, 1976

[54] DEVICE FOR CLOSING AND OPENING VACUUM X-RAY FILM HOLDERS

[76] Inventor: Andreas Schmitzer, Rebenweg 41, Kelheim, Donau, Germany

[22] Filed: Mar. 12, 1975

[21] Appl. No.: 557,743

[30] Foreign Application Priority Data
Mar. 23, 1974 Germany............................ 2414073

[52] U.S. Cl................................. 250/480; 250/475
[51] Int. Cl.²........................................ G03B 41/16
[58] Field of Search ............ 250/475, 480, 481, 457

[56] References Cited
UNITED STATES PATENTS

| | | | |
|---|---|---|---|
| 2,566,266 | 8/1951 | Uhle et al............................ | 250/480 |
| 3,392,281 | 7/1968 | Sherwood............................ | 250/480 |
| 3,535,518 | 10/1970 | Fisher................................. | 250/480 |
| 3,884,818 | 5/1975 | Tomita et al. ...................... | 250/480 |

Primary Examiner—Archie R. Borchelt
Assistant Examiner—B. C. Anderson
Attorney, Agent, or Firm—Erwin Salzer

[57] ABSTRACT

A device for closing and opening X-ray film holders is provided with a pressure plate and a flexible partition separating the device into a main compartment and an auxiliary compartment. Each of said compartments is provided with means allowing the particular compartment to be evacuated and to be exposed to air under atmospheric pressure, irrespective of the condition of vacuum and/or pressure prevailing in the other of said compartments.

5 Claims, 2 Drawing Figures

DEVICE FOR CLOSING AND OPENING VACUUM X-RAY FILM HOLDERS

BACKGROUND OF THE INVENTION

X-ray films, when prepared for exposure, are stored in light-tight film holders, kept closed by a vacuum prevailing inside of the film holder combined with external atmospheric pressure prevailing outside the film holder. Such film holders are well known in the art. Such film holders are more fully disclosed in my patent application Ser. No. 343,982, filed Mar. 22, 1973 for VACUUM FILM HOLDER FOR RADIOGRAPHY, now abandoned.

This invention refers more particularly to means for opening and closing vacuum X-ray film holders. It is common practice to use for this purpose means defining chambers for receiving the film holders for X-ray films. Such chambers are provided with means for selectively establishing therein a vacuum or atmospheric pressure. Such chambers are further provided with means operable from the outside of the chamber in the presence of a vacuum therein for performing some mechanical operation inside of the chamber. Prior art devices of this kind generally include a bushing for mechanical, hydraulic or pneumatic means projecting through one of the chamber-forming walls, operable from the outside of the chamber by a manipulator for actuation of a film holder inside of the chamber. These prior art devices are relatively complex and the aforementioned bushings thereof are an undesirable feature, their fluid-tightness never being fully assured. Furthermore, the aforementioned prior art devices do not lend themselves to form part of automated film-change and film-processing systems.

The object of the present invention is to provide improved devices for opening and closing vacuum X-ray film holders which devices are not subject to the drawbacks and limitations of the aforementioned prior art devices.

SUMMARY OF THE INVENTION

Devices embodying the present invention include box-like means defining a chamber for receiving vacuum film holders for X-ray films. A pressure plate arranged inside said chamber is operable from the outside thereof for selectively exerting pressure upon, and relieving pressure from, film holders inside said chamber. The chamber has flexible partition means having inner ends integral with said pressure plate and having outer ends integral with said chamber-defining means, sub-dividing said chamber into a main compartment and into an auxiliary compartment. The compartments are tightly separated from each other so as to preclude any significant flow of air from one into the other. The main compartment is provided with first passageway means for selectively evacuating said main compartment and for admitting atmospheric pressure to said main compartment. The auxiliary compartment is provided with second passageway means for selectively evacuating said auxiliary compartment and for admitting atmospheric pressure to said auxiliary compartment.

DESCRIPTION OF PREFERRED EMBODIMENT

Figure 1:
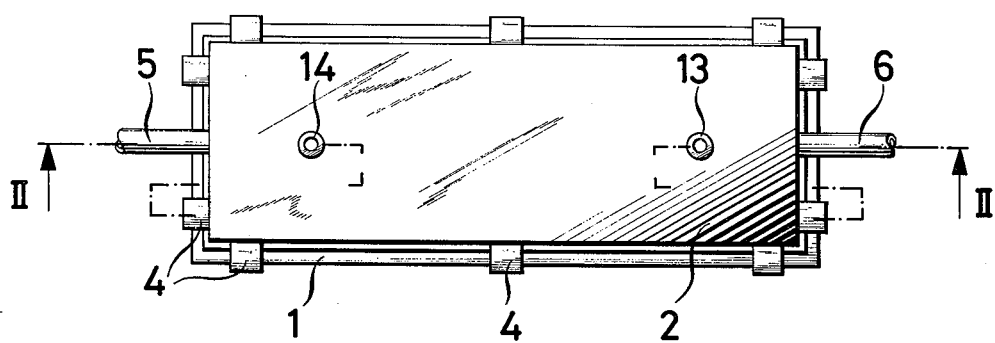
FIG. 1 is a top-plan view of a device embodying the present invention.

Referring now to the drawings, numeral 1 has been applied to indicate a base plate supporting a hood-like box 2. Base plate 1 supports a rectangular flexible seal 3 and the lower edges of the lateral walls of hood-like box 2 engage, and rest upon, seal 3. Hood-like box 2 and seal 3 are held in firm engagement by appropriate clamping means such as, for instance, a plurality of clamps 4. The provision of clamping means is, however, not mandatory. In some instances clamping means of any kind may be dispensed with in which instances pressure must be applied upon hood-like box 2 when evacuating the main compartment 11 of the device, to be described below in detail. The chamber defining means 1,2 are provided with a horizontal pressure plate 9 arranged therein. The space below pressure plate 9 is the above referred-to main compartment 11 of the device and the space above pressure plate 9 will be referred-to hereinafter as the auxiliary compartment 12 of the device. The main compartment 11 and the auxiliary compartment 12 must be separated tightly from each other so that no significant air flow can occur from one into the other when one is evacuated and the other is not evacuated. To this end the device is provided with flexible partition means 10 having inner ends integral with pressure plate 9 and having outer ends integral with hood-like box 2. The flexible partition means 10 may be formed by a flexible bellows. As an alternative, the flexible partition means 10 may be formed by a flexible membrane or diaphragm having a portion affixed to pressure plate 9 and having outer ends affixed to hood-like box 2. Reference numeral 5 has been applied to indicate a passageway or duct intended to be connected to a vacuum pump (not shown) for evacuating main compartment 11 and reference numeral 6 has been applied to indicate a passageway or duct for admitting air at atmospheric pressure to main compartment 11. It will be understood that passageways or ducts 5,6 are provided with valves (not shown) which may be operated either manually, or automatically, in a predetermined sequence which will be apparent from what follows.

Reference numeral 13 has been applied to indicate a passageway or duct intended to be connected to a vacuum pump (not shown) for evacuating the auxiliary compartment 12 and reference numeral 14 has been applied to indicate a passageway or duct for admitting air at atmospheric pressure to auxiliary compartment 12. It will be understood that passageways 13,14 are provided with valves (not shown) which may be operated either manually, or automatically.

The sequence in which the valves controlling passageways or ducts 5,6,13,14 must be opened and closed will become fully apparent from the way in which the device is applied, to be described below in detail.

Figure 2:
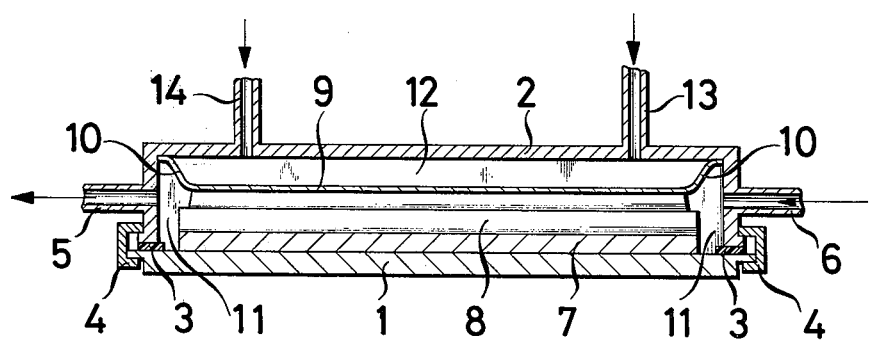
FIG. 2 is a longitudinal section of the device shown in FIG. 1 taken along the median plane of FIG. 1.

In FIG. 2 reference numeral 7 has been applied to indicate a support for a vacuum film holder 8.

A vacuum film holder 8 intended to be closed is placed upon support 7 and parts 1,2 are then caused to engage under pressure resulting in compression of flexible seal 3. Thereupon passageway 14 is closed and auxiliary compartment 12 is evacuated by connecting passageway 13 to a vacuum pump. As a result, partition means 9 do not exert any longer pressure upon film holder 8. Thereupon passageway 6 is closed and main compartment 11 is evacuated by connecting passageway 5 to a vacuum pump. As a result, the inside of film holder 8 is evacuated. Next auxiliary compartment 12 is disconnected from the vacuum pump, and air under atmospheric pressure is admitted through passageway 14 into auxiliary compartment 12. As a result, partition 9 now engages under pressure film holder 8 and causes the constituent parts thereof to engage under pressure. Thereupon passageway 5 is disconnected from the vacuum pump, and air under atmospheric pressure is admitted through passageway 6 into main compartment 11. The film holder is now maintained by external pressure and internal vacuum in its closed position, and may be removed from the loading device and exposed to X-rays.

Opening film holder 8 is effected as follows. Upon placement of film holder 8 inside the chamber formed by parts 1,2, as shown in FIG. 2, auxiliary chamber 12 is evacuated by blocking passageway 14 and connecting passageway 13 to a vacuum pump. As a result, pressure plate 9 does not any longer exert any pressure upon film holder 8. Thereupon a vacuum is established in main compartment 11 by blocking passageway 6 and connecting passageway 5 to a vacuum pump. That vacuum ought to be slightly higher than the vacuum produced in main compartment 11 when closing film holder 8. Under such conditions film holder 8 will open automatically as a result of the difference in magnitude of the outside and the inside vacuum. When the film holder 8 is opened, air under atmospheric pressure may be admitted through passageway 6 into main compartment 11. Film holder 8 remains open while this is done, and its inside is now subjected to the pressure of atmospheric air. Hence it may be removed from the enclosure 1,2.

It will be understood that the same vacuum pump may be used for evacuating main compartment 11 and auxiliary compartment 12, and that the necessary sequences of opening and closing of passageways 5,6,13,14 may readily be effected automatically, e.g. by solenoid valves under the control of cam-operated switches.

I claim as my invention:

1. A device for closing and opening vacuum film holders for X-ray films including
    a. means defining a chamber for receiving vacuum film holders for X-ray films;
    b. a pressure plate arranged inside said chamber and operable from the outside thereof selectively exerting pressure upon, and relieving pressure from, vacuum film holders inside said chamber;
    c. flexible partition means having inner ends integral with said pressure plate and having outer ends integral with said chamber-defining means subdividing said chamber into a main compartment and into an auxiliary compartment being tightly separated from each other to preclude any significant flow of air from one compartment to the other;
    d. first passageway means for selectively evacuating said main compartment and for admitting air at atmospheric pressure to said main compartment; and
    e. second passageway means for selectively evacuating said auxiliary compartment and for admitting air at atmospheric pressure to said auxiliary compartment.

2. A device as specified in claim 1 wherein said flexible partition means is formed by a bellows.

3. A device as specified in claim 1 wherein said flexible partition means is formed by a flexible membrane.

4. A device as specified in claim 1 wherein said first means include a first evacuating passageway and a first air admission passageway each provided with one of a first pair of valves, and wherein said second means include a second evacuating passageway and a second air admission passageway each provided with one of a second pair of valves.

5. A device as specified in claim 4 including a control device controlling the sequence of operation of said first means and of said second means.

* * * * *